US008320457B2

(12) United States Patent
Shin et al.

(10) Patent No.: US 8,320,457 B2
(45) Date of Patent: Nov. 27, 2012

(54) DISPLAY DEVICE AND METHOD OF DRIVING THE SAME

(75) Inventors: Byung-Hyuk Shin, Seoul (KR); Min-Kyu Park, Asan-si (KR); Kyung-Woo Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 851 days.

(21) Appl. No.: 12/471,870

(22) Filed: May 26, 2009

(65) Prior Publication Data

US 2009/0295768 A1 Dec. 3, 2009

(30) Foreign Application Priority Data

May 29, 2008 (KR) ........................ 10-2008-0050505

(51) Int. Cl.
*H04B 1/66* (2006.01)
*G06K 9/48* (2006.01)

(52) U.S. Cl. .................................. 375/240.16; 382/199

(58) Field of Classification Search .................. 348/554, 348/448, 465, 441, 452, 563, 565, 569, 589, 348/600; 375/240.01–240.26; 382/199, 382/300, 195
See application file for complete search history.

(56) References Cited

U.S. PATENT DOCUMENTS

| | | | | |
|---|---|---|---|---|
| 8,115,867 | B2 * | 2/2012 | Miyauchi et al. | 348/452 |
| 2006/0165176 | A1 * | 7/2006 | Raveendran et al. | 375/240.16 |
| 2007/0165953 | A1 * | 7/2007 | Kim et al. | 382/199 |
| 2007/0171301 | A1 * | 7/2007 | Tatsumi | 348/446 |
| 2008/0008243 | A1 * | 1/2008 | Ozdemir | 375/240.16 |
| 2008/0240617 | A1 * | 10/2008 | Douniwa | 382/300 |
| 2008/0298685 | A1 * | 12/2008 | Maeda | 382/195 |

FOREIGN PATENT DOCUMENTS

| | | |
|---|---|---|
| JP | 2001-042831 | 2/2001 |
| KR | 10-2005-0012744 | 2/2005 |
| KR | 10-2007-0070513 | 7/2007 |

* cited by examiner

*Primary Examiner* — Behrooz Senfi
(74) *Attorney, Agent, or Firm* — Cantor Colburn LLP

(57) ABSTRACT

A display device with improved display quality and a method of driving the display device set at least one static area in each of a previous frame and a current frame by comparing edge areas of the previous frame and edge areas of the current frame, and create an interpolated frame for display between the previous and current frames. At least one static area of the previous frame is used in an unmodified state as a static area of the interpolated frame.

20 Claims, 9 Drawing Sheets

[ Previous frame]

[ Current frame]

[ Interpolated frame]

DISPLAY DEVICE AND METHOD OF DRIVING THE SAME

This application claims priority to Korean Patent Application No. 10-2008-0050505, filed on May 29, 2008, and all the benefits accruing there from under 35 U.S.C. §119, the contents of which in its entirety are herein incorporated by reference.

BACKGROUND OF THE INVENTION

1. Field of the Invention

The present invention relates to a display device and a method of driving the display device, and more particularly, to a display device with improved display quality and a method of driving the display device.

2. Description of the Related Art

Recently, techniques of improving the display quality of a display device by inserting interpolated frames obtained by compensating for the motion of an object among original frames have been developed. In these techniques, if image information regarding, for example, sixty original frames, is given, image information regarding sixty interpolated frames may be additionally provided, thereby providing an image having a total of 120 frames.

These techniques involve estimating the motion of an object by extracting a motion vector, e.g., these techniques involve searching a previous frame for the best display block match for each display block of a current frame, extracting a plurality of motion vectors corresponding to motion information between the previous frame and the current frame, generating a number of motion-compensated interpolated frames based on the motion vectors, and inserting the interpolated frames among a number of original frames.

However, the insertion of interpolated frames among original frames of an image may cause deterioration in display quality, especially when the image includes a plurality of moving objects or an object that suddenly appears in or disappears from the image. In such cases, the insertion of interpolated frames with motion vector derived images may cause blurring between the discreet moving objects or may extend the display of an image beyond its intended length.

BRIEF SUMMARY OF THE INVENTION

Aspects of the present invention provide a display device with improved display quality. Aspects of the present invention also provide a method of driving a display device with improved display quality.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an exemplary embodiment of the present invention, there is provided a method of driving a display device, the method including; setting at least one static area in each of a previous frame and a current frame by comparing edge areas of the previous frame and edge areas of the current frame, and creating an interpolated frame for display between the previous and current frames, wherein the at least one static area of the previous frame is used in an unmodified state as a static area of the interpolated frame.

According to another exemplary embodiment of the present invention, there is provided a display device including; a signal control module which receives an image signal of a previous frame and an image signal of a current frame and inserts an image signal of an interpolated frame between the previous frame and the current frame, the signal control module having a static area setter which sets at least one static area in each of the previous frame and the current frame by comparing edge areas of the previous frame and edge areas of the current frame and an image interpolator which provides the image signal of the interpolated frame, wherein the static area of the previous frame is used in an unmodified state as a static area of the interpolated frame.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
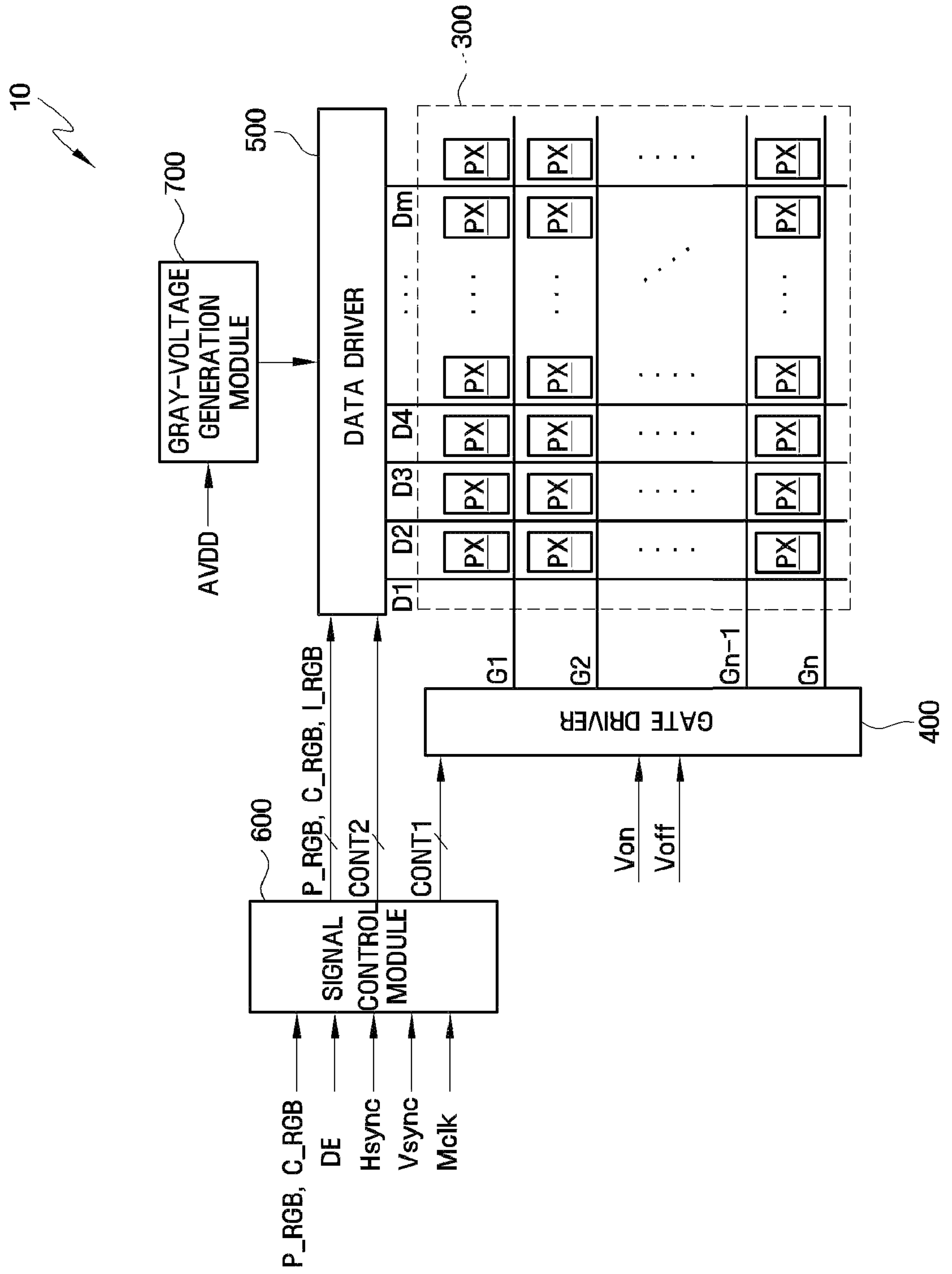
FIG. 1 illustrates a block diagram of an exemplary embodiment of a display device according to the present invention.

The invention now will be described more fully hereinafter with reference to accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in the figures is turned over, elements described as being on the "lower" side of other elements would then be oriented on "upper" sides of the other elements. The exemplary term "lower," can therefore encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

An exemplary embodiment of a display device according to the present invention will hereinafter be described in detail, using a liquid crystal display ("LCD") as an example. However, the present invention is not restricted to an LCD. That is, the present invention can be applied to other various display devices such as a plasma display panel ("PDP") or an organic light-emitting diode ("OLED") or various other display devices as would be apparent to one of ordinary skill in the art.

A display device and a method of driving the display device according to exemplary embodiments of the present invention will hereinafter be described in detail with reference to FIGS. 1 and 2. FIG. 1 illustrates a block diagram of an exemplary embodiment of a display device 10 according to the present invention, and FIG. 2 illustrates an equivalent circuit diagram of an exemplary embodiment of a pixel PX of a display panel 300 shown in FIG. 1.

Referring to FIG. 1, the LCD 10 includes a display panel 300, a signal control module 600, a gate driver 400, a data driver 500, and a gray-voltage generation module 700.

The display panel 300 includes a plurality of gate lines G1 through Gn, a plurality of data lines D1 through Dm and a plurality of pixels PX. The gate lines G1 through Gn extend in a first direction substantially in parallel with one another, and the data lines D1 through Dm extend in a second direction substantially in parallel with one another. The pixels PX are disposed at areas between the gate lines G1 through Gn and the data lines D1 through Dm. A gate signal may be applied to each of the gate lines G1 through Gn by the gate driver 400, and an image data voltage may be applied to each of the data lines D1 through Dm by the data driver 500. Each of the pixels PX displays an image in response to the image data voltage.

Figure 2:
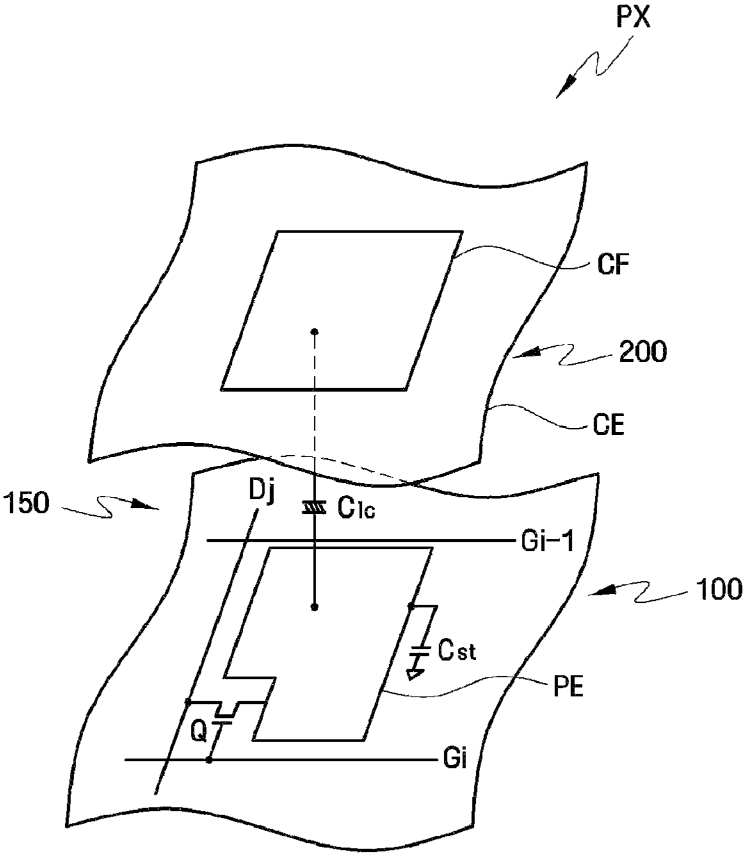
FIG. 2 illustrates an equivalent circuit diagram of an exemplary embodiment of a pixel of a display panel shown in FIG. 1.

Referring to FIG. 2, a pixel PX, which is connected to an i-th gate line Gi (wherein i is an integer $1 \leqq i \leqq n$) and a j-th data line Dj (wherein j is an integer $1 \leqq j \leqq m$), includes a switching element Q, which is connected to the i-th gate line Gi and the j-th data line Dj, and a liquid crystal capacitor $C_{1c}$ and a storage capacitor $C_{st}$, which are both connected to the switching element Q. The liquid crystal capacitor $C_{1c}$ includes a pixel electrode PE, which is formed on a first display panel 100, a common electrode CE, which is formed on a second display panel 200, and liquid crystal molecules 150, which are interposed between the pixel electrode PE and the common electrode CE. A color filter CF may be disposed on or under at least a portion of the common electrode CE. Alternatively, The common electrode CE may be form on the first display panel 100.

Referring to FIG. 1, the signal control module 600 receives an image signal (hereinafter referred to as the previous image signal) P_RGB of a previous frame, an image signal (hereinafter referred to as the current image signal) C_RGB of a current frame, and a plurality of external control signals Vsync, Hsync, Mclk and DE for controlling the display of the previous and current image signals P_RGB and C_RGB, and outputs the previous and current image signals P_RGB and C_RGB, an image signal (hereinafter referred to as the interpolated image signal) I_RGB of an interpolated frame, a gate control signal CONT1 and a data control signal CONT2. In one exemplary embodiment, the previous, interpolated and the current image signals P_RGB, I_RGB and C_RGB may be sequentially output to the data driver 500.

More specifically, the signal control module 600 may receive the previous and current image signals P_RGB and C_RGB, may generate the interpolated image signal I_RGB based on the previous and current image signals P_RGB and the C_RGB, and may output the previous, interpolated and the current image signals P_RGB, I_RGB and C_RGB to the data driver 500.

The signal control module 600 may receive the external control signals Vsync, Hsync, Mclk and DE and generate the data control signal CONT1 and the gate control signal CONT2. In the present exemplary embodiment, the external control signals Vsync, Hsync, Mclk and DE include a vertical synchronization signal Vsync, a horizontal synchronization signal Hsync, a main clock signal Mclk, and a data enable signal DE, although alternative exemplary embodiments include configurations wherein additional external control signals may be added and wherein some of the external control signals may be omitted. The gate control signal CONT2 is a signal for controlling the operation of a gate driving unit 400, and the data control signal CONT1 is a signal for controlling the operation of a data driving unit 500. The signal control module 600 will be described later in further detail with reference to FIG. 3.

The gate driver 400 is provided with the gate control signal CONT1 by the signal control module 600, and applies a gate signal to the gate lines G1 through Gn. The gate signal may include the combination of a gate-on voltage Von and a gate-off voltage Voff, which may be provided by a gate-on/off voltage generation module (not shown).

The data driver 500 is provided with the data control signal CONT2 by the signal control module 600, and applies image data voltages respectively corresponding to the previous, current and interpolated image signals P_RGB, C_RGB and I_RGB to the data lines D1 through Dm. The image data voltages respectively corresponding to the previous, current and interpolated image signals P_RGB, C_RGB and I_RGB may be provided by the gray-voltage generation module 700.

The gray-voltage generation module 700 may generate a plurality of gray voltages by dividing a driving voltage AVDD according to the grayscale levels of the previous, current and interpolated image signals P_RGB, C_RGB and I_RGB, and may provide the gray voltages to the data driver 500. In one exemplary embodiment, the gray-voltage generation module 700 may include a plurality of resistors which are connected in series between a ground and a node, to which the driving voltage AVDD is applied, and may thus generate a plurality of gray voltages by dividing the driving voltage AVDD. However, the structure of the gray-voltage generation module 700 is not restricted to this exemplary embodiment. That is, the gray-voltage generation module 700 may be realized in various manners, other than that set forth herein as would be apparent to one of ordinary skill in the art.

Figure 3:
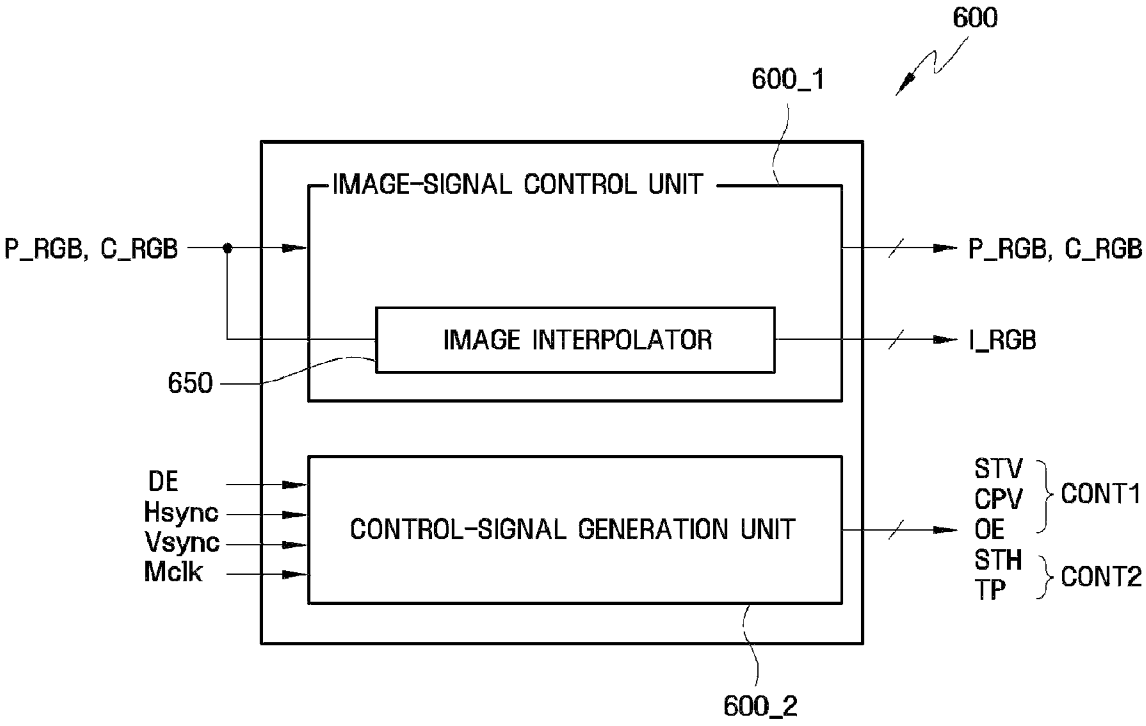
FIG. 3 illustrates a block diagram of an exemplary embodiment of a signal control module shown in FIG. 1.

FIG. 3 illustrates a block diagram of the signal control module 600. Referring to FIG. 3, the signal control module 600 includes an image-signal control unit 600_1 and a control-signal generation unit 600_2. The image-signal control unit 600_1 includes an image interpolator 650.

The image interpolator 650 may receive the previous and current image signals P_RGB and C_RGB, may generate the interpolated image signal I_RGB based on the previous and current image signals P_RGB and C_RGB and may output the interpolated image signals I_RGB. In another exemplary embodiment, the image interpolator 650 may output the previous, current and interpolated image signals P_RGB, C_RGB and I_RGB. The image-signal control unit 600_1 and the image interpolator 650 will be described later in further detail with reference to FIG. 4.

The control-signal generation unit 600_2 may receive the external control signals Vsync, Hsync, Mclk and DE and may generate the gate control signal CONT1 and the data control signal CONT2. The gate control signal CONT1 is a signal for controlling the operation of the gate driver 400. The gate control signal CONT1 may include a vertical initiation signal STV for initiating the operation of the gate driver 400, a gate clock signal CPV for determining when to output the gate-on voltage Von, and an output enable signal OE for determining the pulse width of the gate-on voltage Von. The data control signal CONT2 may include a horizontal initiation signal STH for initiating the operation of the data driver 400 and an output instruction signal TP for providing instructions to output an image data voltage.

The image-signal control unit 600_1 will hereinafter be described in detail with reference to FIGS. 4 through 8. The term 'static area' indicates a region of a display in which an image of a static object or a static character is displayed. Exemplary embodiments of the static character include subtitles and an on-screen display ("OSD") image. An OSD image will be described later in detail with reference to FIG. 8.

Figure 4:
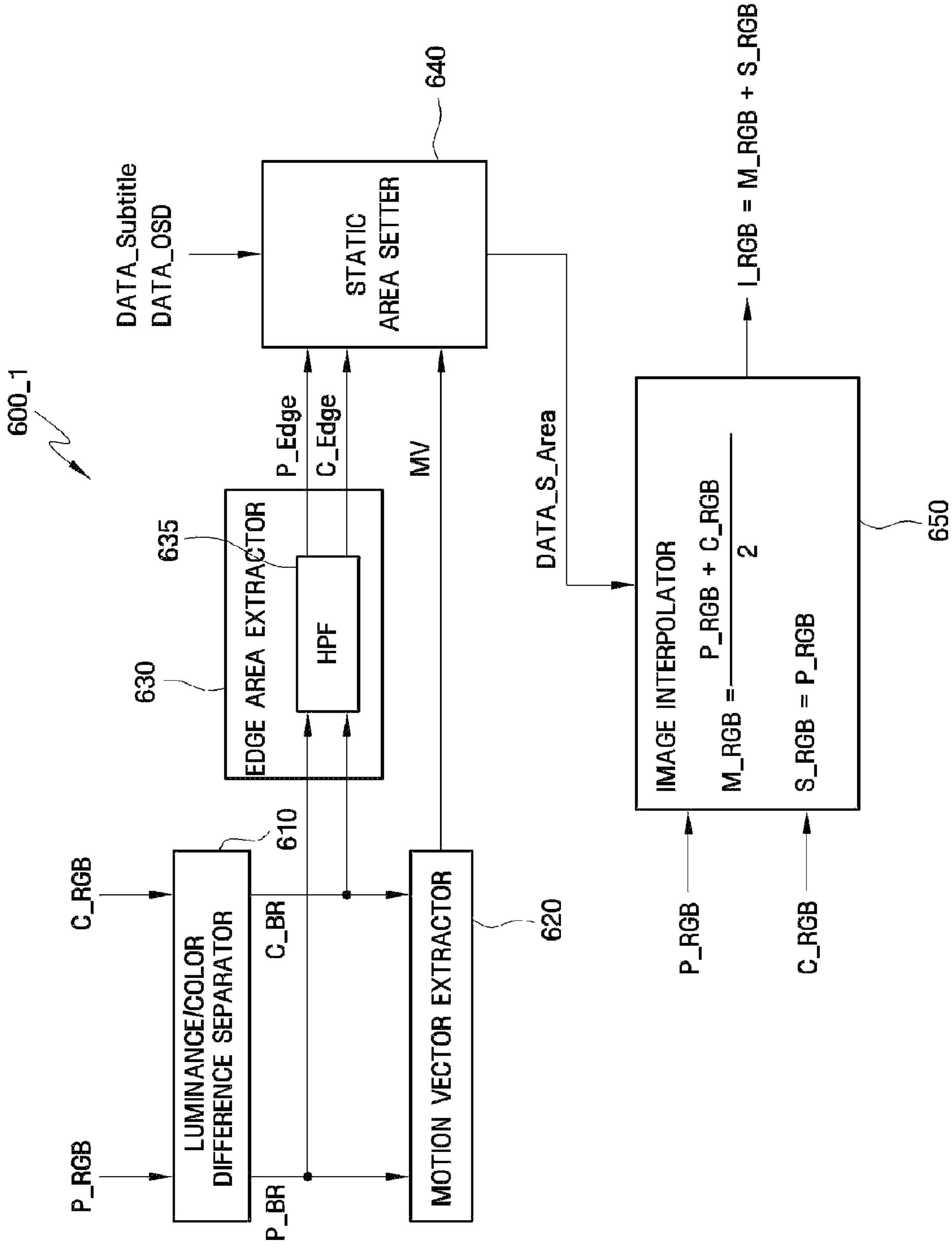
FIG. 4 illustrates a block diagram of an exemplary embodiment of an image-signal control unit shown in FIG. 3.

FIG. 4 illustrates a block diagram of an exemplary embodiment of the image-signal control unit 600_1 shown in FIG. 3. Referring to FIG. 4, the exemplary embodiment of an image-signal control unit 600_1 may include a luminance/color difference separator 610, a motion vector extractor 620, an edge area extractor 630, a static area setter 640, and an image interpolator 650.

The luminance/color difference separator 610 separates the luminance component and the color difference component of each of the previous and current image signals P_RGB and C_RGB. The luminance component of an image signal includes brightness information of the image signal. The color difference component of an image signal includes color information of the image signal.

The motion vector extractor 620 extracts a motion vector MV from the previous frame and the current frame. More specifically, in one exemplary embodiment the motion vector extractor 620 is provided with the luminance components of the previous and current image signals P_RGB and C_RGB by the luminance/color difference separator 610, and extracts the motion vector MV therefrom. A motion vector is a notation for indicating the motion of an object in an image, e.g., the motion vector includes information on both the direction and distance of motion of the object. The motion vector extractor 620 may analyze the luminance components of the previous and current image signals P_RGB and C_RGB, may detect portions of the previous and current frames having almost the same luminance levels, may determine that each of the detected portions of the previous and current frames includes a same object, and may extract the motion vector MV indicating the motion of the object between the previous and current frames. The extraction of the motion vector MV by the motion vector extractor 620 will be described later in further detail with reference to FIGS. 5 through 7.

The edge area extractor 630 may extract a number of edge areas P_Edge of the previous frame and a number of edge areas C_Edge of the current frame. In one exemplary embodiment, it does so by performing high pass filtering on the previous and current image signals P_RGB and C_RGB. An edge area of a frame is a region of an image including an edge. An edge in an image is a region including a boundary across which the position, the shape and the size of an object in the image vary; conversely, on the other side of the boundary the position, shape and size of objects do not vary. The edge area extractor 630 may extract the previous areas P_Edge and the edge areas C_Edge from, for example, certain parts of the previous and current frames, in which the previous and current frames at which high-frequency signals exist, by performing high pass filtering on the previous and current image signals P_RGB and C_RGB. Exemplary embodiments of edge areas P_Edge may include the dark areas above and below a letter-boxed image.

More specifically, the edge area extractor 630 may analyze the luminance components of an image signal and may thus extract the edges of an image corresponding to the image signal. For this, the edge area extractor 630 may include a high-pass filter ("HPF") 635. The HPF 635 is provided with the luminance components of the previous and current image signals P_RGB and C_RGB by the luminance/color difference separator 610 and performs high pass filtering on the luminance components of the previous and current image signals P_RGB and C_RGB. Since the edges of an image are highly likely to be detected from parts of the image where the luminance of the image increases or decreases, it is possible to extract the edge areas P_Edge and the edge areas C_Edge by analyzing the distribution of luminance levels in an image obtained by high pass filtering performed by the HPF 635 and extracting edge areas of the image from parts of the image where high luminance levels are detected.

The static area setter 640 compares the edge areas P_Edge and the edge areas C_Edge, sets a static area based on the results of the comparison, and provides a static area data DATA_S_Area regarding the static area to the image interpolator 650.

More specifically, the static area setter 640 may be provided with the motion vector MV by the motion vector extractor 620 and may set edge areas of the previous and current frames in which the motion vector MV has a value of 0 as static areas.

In addition, the static area setter 640 may be provided with subtitle activation data DATA_Subtitle or OSD image activation data DATA_OSD by an external source and may set edge areas of the previous and current frames including subtitles or an OSD image as static areas.

The subtitle activation data DATA_Subtitle may include information indicating the position of a portion of the display panel 300 on which subtitles are displayed. Likewise, the OSD image activation data DATA_OSD may include information indicating the position of a portion of the display panel 300 on which an OSD image is displayed.

If there are both an edge area in which the motion vector MV has a value of 0 and an edge area including subtitles or an OSD image, the static area setter 640 may prioritize the edge area including subtitles or an OSD image over the edge area in which the motion vector MV has a value of 0 and may thus set the edge area including subtitles or an OSD image as a static area. For example, even through subtitles or on-screen display images are displayed in a letter-boxed area, that area will still be set as a static area for image interpolation purposes.

The image interpolator 650 may be provided with the previous image signal P_RGB, the current image signal C_RGB, and the static area data DATA_S_Area, and may provide the interpolated image signal I_RGB.

More specifically, the image interpolator 650 may be provided with the static area data DATA_S_Area, may divide the interpolated frame into a dynamic area and a static area, and may divide the interpolated image signal I_RGB into an image signal M_RGB regarding the dynamic area of the interpolated frame and an image signal S_RGB regarding the static area of the interpolated frame.

An image signal indicating the motion of an object between the previous and current frames may be provided in the dynamic area of the interpolated frame. Thus, the image signal M_RGB may be obtained by averaging the previous image signal P_RGB and the current image signal C_RGB corresponding to the previous image signal P_RGB, as illustrated in FIG. 4.

The previous image signal P_RGB is provided in the static area of the interpolated frame. Thus, the previous image signal P_RGB may be used as it is as the image signal S_RGB, as illustrated in FIG. 4. Alternative exemplary embodiments may include configurations wherein the current image signal C_RGB may be used as it is as the image signal S_RGB.

In short, the interpolated frame may be divided into a static area and a dynamic area, and only the image signal M_RGB regarding the dynamic area of the interpolated frame may be provided. Thus, it is possible to reduce the occurrence of errors during the generation of the interpolated frame and thus to improve the quality of display.

In addition, a static area may be set simply by comparing the edge areas P_Edge and the edge areas C_Edge, instead of comparing all blocks on the display panel 300. Thus, it is possible to quickly set a static area.

Figure 5:
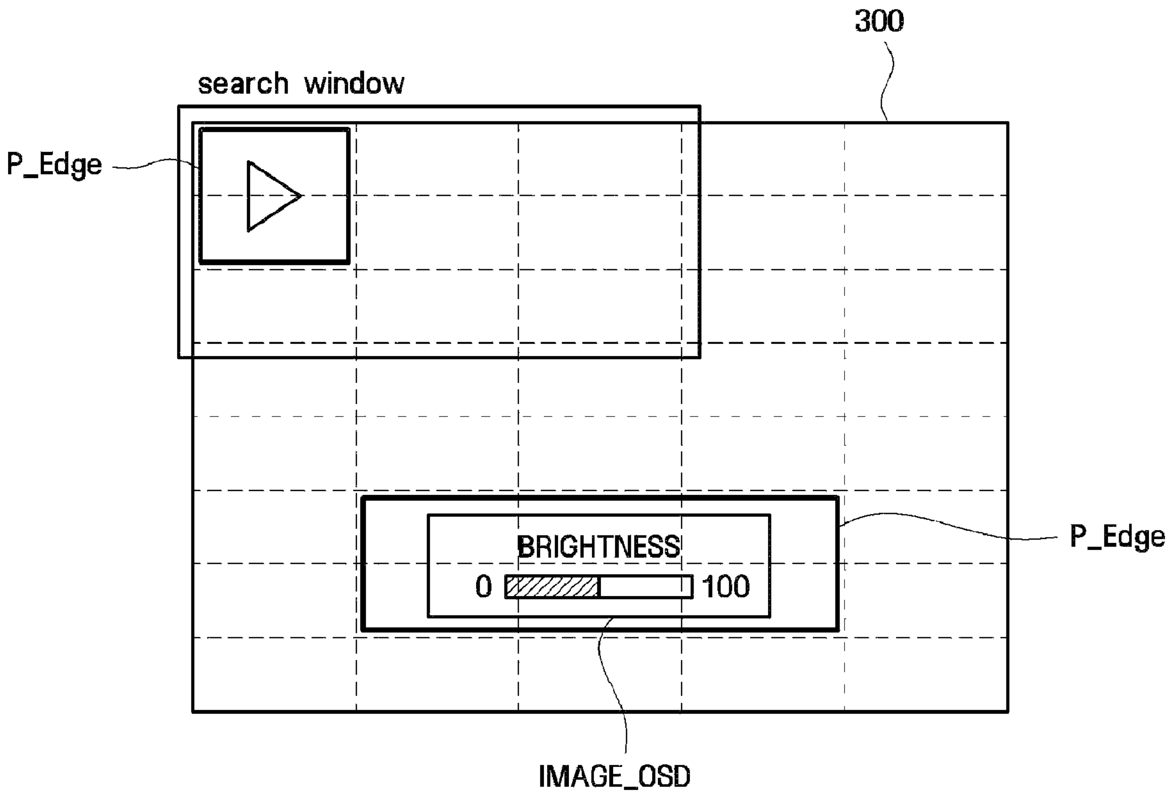
FIGS. 5, 6 and 7 respectively illustrate diagrams of a previous frame, a current frame, and an interpolated frame.
Figure 6:
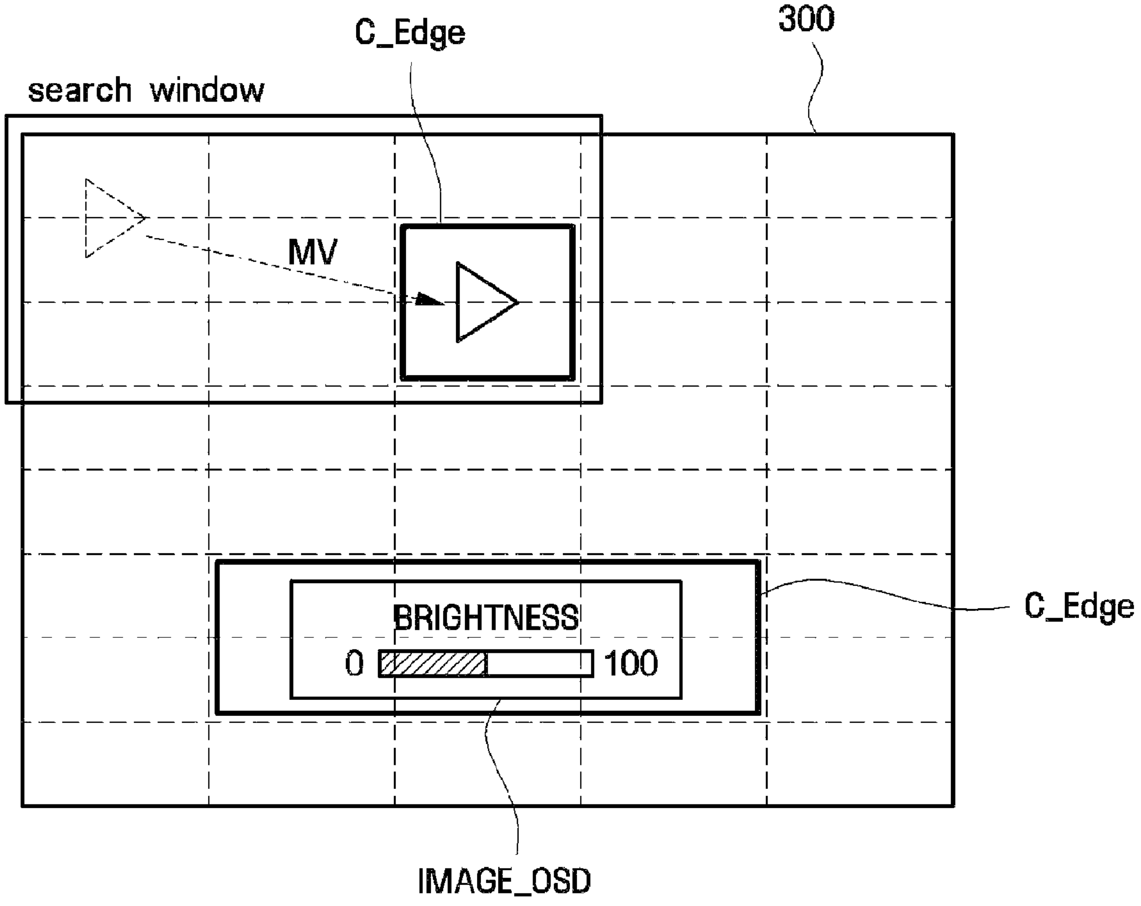
Figure 7:
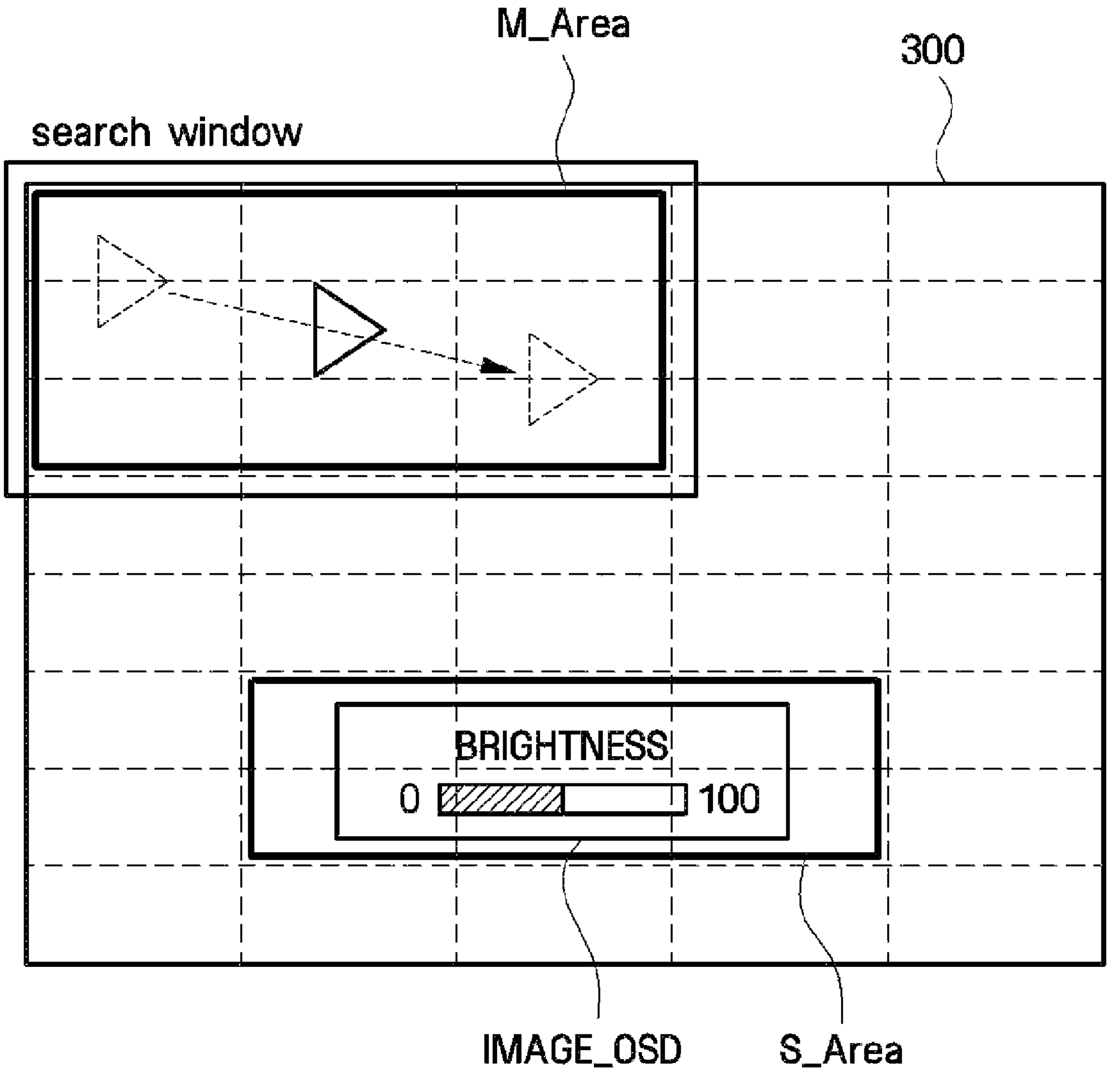

The operation of the image-signal control unit 600_1 will hereinafter be described in further detail with reference to FIGS. 5 through 7. FIGS. 5 through 7 illustrate previous, current and interpolated frames, respectively. Referring to FIGS. 5 through 7, a number of blocks occupied by an OSD image IMAGE_OSD are set as a static area.

Referring to FIGS. 5 through 7, the display panel 300 maybe divided into a plurality of blocks, and each of the blocks may include a plurality of pixels (not shown).

Referring to FIGS. 5 and 6, two edge areas P_Edge are extracted from a previous frame and two edge areas C_Edge are extracted from a current frame. The edge areas P_Edge and the edge areas C_Edge are regions including boundaries across which the position, the shape, and the size of an object in an image vary. Thereafter, the edge areas P_Edge and the edge areas C_Edge may be compared, and a static area may be set in each of the previous and current frames based on the results of the comparison.

Referring to FIGS. 5 through 7, an edge area in which a motion vector MV has a value of 0 is set as a static area. More specifically, the edge areas P_Edge and the edge areas C_Edge are compared, and the previous frame may be searched for the best matching block for each block of the current frame on the results of the comparison, thereby extracting a motion vector MV from each of the previous and current frames.

The previous frame may be searched for the best matching block for each block of the current frame by using a sum-of-absolute difference ("SAD") method, in which a block of the previous frame producing a smallest sum of absolute luminance differences with each block of the current frame is determined to be the best matching block for a corresponding block of the current frame. The SAD method is well-known to one of ordinary skill in the art to which the present invention pertains, and thus a detailed description of the SAD method will be omitted.

Referring to FIG. 6, the motion vector MV is as indicated by an arrow. The motion vector MV has a value of 0 in each of a plurality of blocks occupied by the OSD image IMAGE_OSD. Thus, referring to the interpolated frame shown in FIG. 7, a plurality of blocks, including the blocks corresponding to the upper edge area P_Edge and the blocks corresponding to the upper edge area C_Edge, may be set as a dynamic area M_Area, and a plurality of blocks occupied by the OSD image IMAGE_OSD may be set as a static area S_Area.

Referring to FIG. 7, an image rendering the motion of an object between the previous frame and the current frame is displayed in the dynamic area M_Area of the interpolated frame, whereas an image displayed in the static area of the previous frame is displayed in the static area S_Area of the interpolated frame.

Referring to FIGS. 5 through 7, the setting of the static area S_Area may be performed using a search window. That is, an edge area may be detected from a plurality of blocks of each of the previous and current frames within a search window of the display panel 300, and the detected edge areas of the previous and current frames may be compared with each other, thereby setting a static area in each of the previous and current frames.

Figure 8:
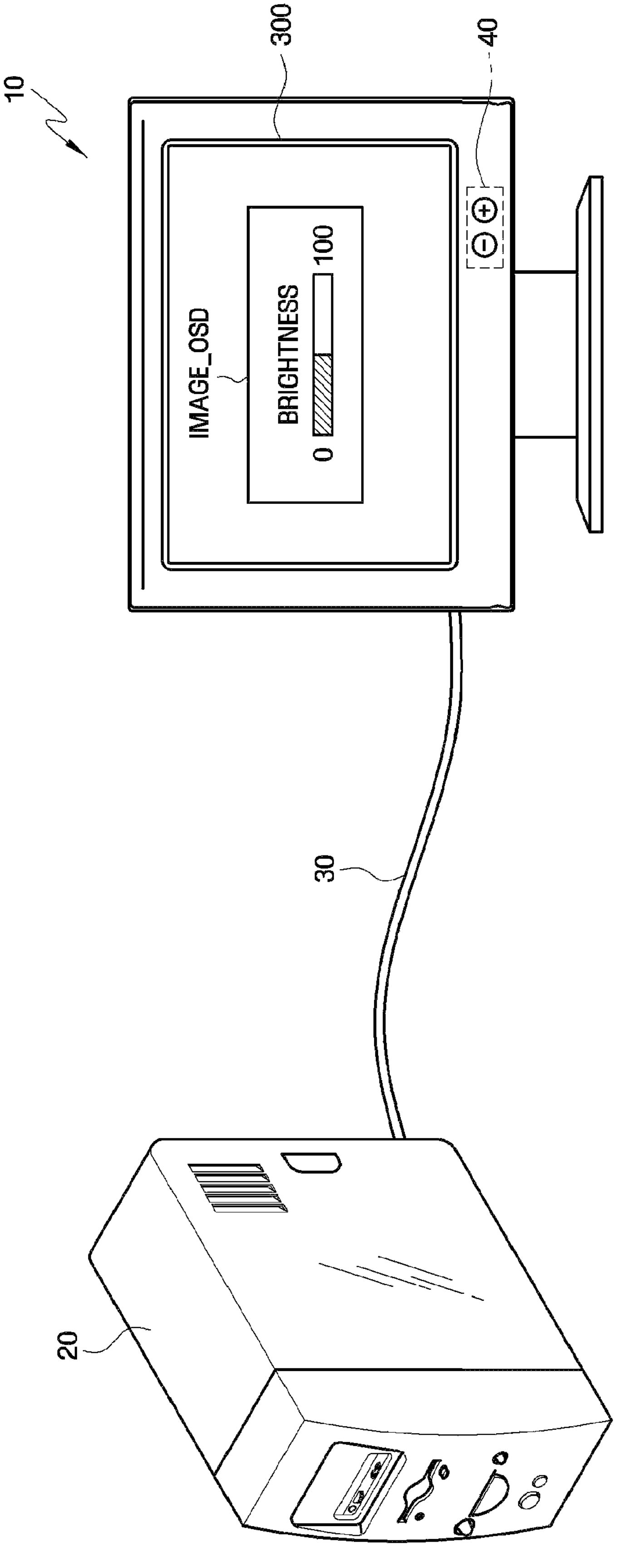
FIG. 8 illustrates a diagram of an on-screen display ("OSD") image shown in FIGS. 5 through 7.

FIG. 8 illustrates a schematic diagram for explaining the OSD image IMAGE_OSD shown in FIGS. 5 through 7. Referring to FIG. 8, the display device 10 may include the display panel 300 and a handling module 40.

In one exemplary embodiment, the handling module 40 may include a number of buttons disposed at the front of the display device 10, and may generate a user command signal according to how a user handles the buttons. For example, if the user presses the buttons of the handling module 40 in order to adjust the luminance or contrast of the display device 10, the handling module 40 may generate a user command signal, and may provide the user command signal to a host device 20 through a transmission cable 30.

The host device 20 may provide the OSD image activation data DATA_OSD and an OSD image signal to the display device 10. The host device 20 is illustrated in FIG. 8 as being a computer, however alternative exemplary embodiments include configurations wherein the host device 20 may be various other appliances as would be apparent to one of ordinary skill in the art. The OSD image activation data DATA_OSD and the OSD image signal may be provided to the display device 10 through the transmission cable 30.

The display device 10 may display the OSD image IMAGE_OSD, which corresponds to the OSD image signal provided by the host device 20, and thus, the user may easily handle the display device 10 using the OSD image IMAGE_OSD.

Figure 9:
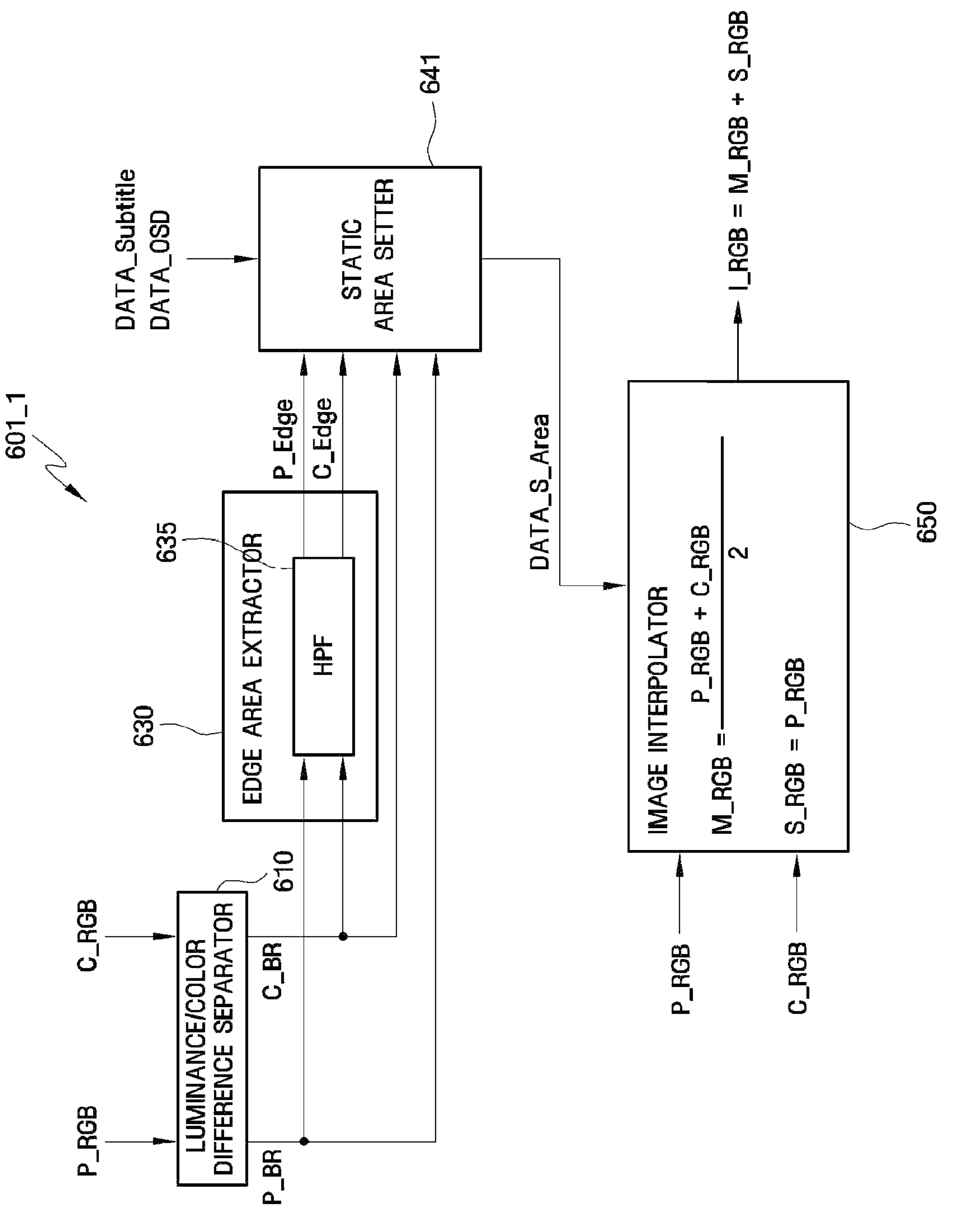
FIG. 9 illustrates a block diagram of another exemplary embodiment of an image-signal control unit shown in FIG. 3 according to the present invention.
Figure 10:
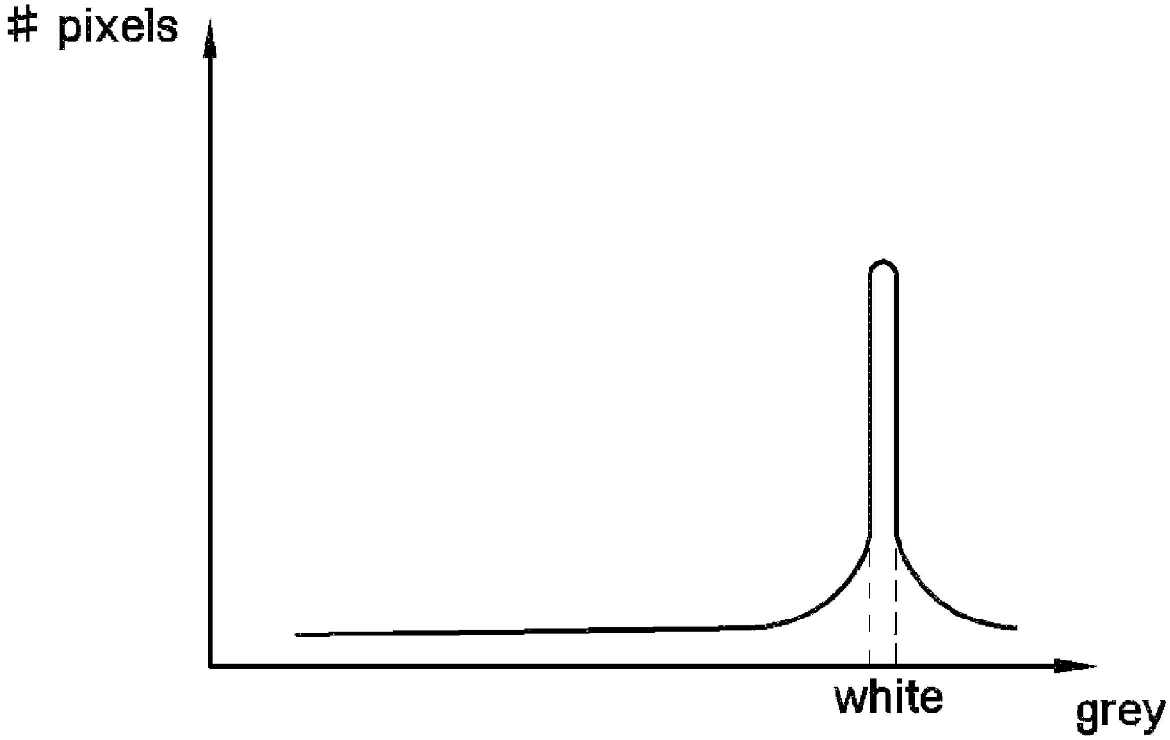
FIG. 10 illustrates a histogram illustrating the operation of a static area setter shown in FIG. 9.

A display device and a method of driving the display device according to another exemplary embodiments of the present invention will hereinafter be described in detail with reference to FIGS. 9 and 10. FIG. 9 illustrates a block diagram of an image-signal control unit 601_1, and FIG. 10 illustrates a histogram for explaining the operation of a static area setter 641 shown in FIG. 9. In FIGS. 1 through 10, like reference numerals indicate like elements, and thus, duplicate descriptions thereof will be omitted.

Referring to FIG. 9, the image-signal control unit 601_1 may include a luminance/color difference separator 610, an edge area extractor 630, a static region setter 641 and an image interpolator 650.

The static region setter 641 may compare a number of edge areas P_Edge of a previous frame and a number of edge areas C_Edge of a current frame and may set a static area in each of the previous and current frames based on the results of the comparison. Thereafter, the static area setter 641 may provide static area data DATA_S_Area regarding the static area to the image interpolator 650.

More specifically, the static area setter 641 may be provided with the luminance components of the previous image signal P_RGB and the current image signal C_RGB by the luminance/color difference separator 610, may analyze the distribution of luminance in the previous and current frames, and may set edge areas of the previous and current frames from which a predetermined luminance level is detected as static areas.

The predetermined luminance level may be the luminance of subtitles or an OSD image included in both the previous and current frames. For example, subtitles or an OSD image may be rendered white. Therefore, referring to FIG. 10, most pixels in an edge area including subtitles or an OSD image may have a grayscale level corresponding to white. Thus, if most pixels in a predetermined edge area have the grayscale level corresponding to white, the predetermined edge area may be set as a static area.

The static area setter 641 may be provided with subtitle activation data DATA_Subtitle or OSD image activation data DATA_OSD by an external source and may set edge areas of the previous and current frames including subtitles or an OSD image as static areas.

If there are both an edge area from which the predetermined luminance level is detected and an edge area including subtitles or an OSD image, the static area setter 641 may prioritize the edge area including subtitles or an OSD image over the edge area from which the predetermined luminance level is detected and may thus set the edge area including subtitles or an OSD image as a static area.

In the embodiment of FIGS. 9 and 10, similar to the exemplary embodiment of FIGS. 1 through 7, if there are both an edge area in which a motion vector has a value of 0, even if that motion vector is not being actively monitored, e.g., by a motion vector extractor, and an edge area including subtitles or an OSD image, the static area setter 641 may prioritize the edge area including subtitles or an OSD image over the edge area in which a motion vector has a value of 0 and may thus set the edge area including subtitles or an OSD image as a static area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving a display device, the method comprising:
- setting at least one static area in each of a previous frame and a current frame by comparing edge areas of the previous frame and edge areas of the current frame;
- creating an interpolated frame for display between the previous and current frames,
- wherein the at least one static area of the previous frame is used in an unmodified state as a static area of the interpolated frame, wherein
- the setting the at least one static area comprises:
  - extracting a luminance distribution from each of the previous frame and the current frame; and
  - setting at least one edge area of the previous and current frames in which a predetermined number of pixels have a luminance level corresponding to at least one of subtitles or an on-screen display image as the at least one static area, according to the extracted luminance distribution.

2. The method of claim 1, wherein the setting the at least one static area comprises extracting a motion vector from the previous frame and the current frame and setting at least one edge area of the previous and current frames in which the motion vector has a value of 0 as the at least one static area.

3. The method of claim 2, wherein the extracting the motion vector comprises separating luminance and color difference components of an image signal of the previous frame, separating luminance and color difference components of an image signal of the current frame, and extracting the motion vector from the luminance components of the image signals of the previous and current frames.

4. The method of claim 1, wherein the setting the at least one static area comprises comparing the luminance distribution of the previous frame and the current frame and setting at least one edge area of the previous and current frames wherein a luminance level within the at least one edge area is substantially the same in the current frame as in the previous frame as the at least one static area.

5. The method of claim 4, wherein:
- each of the previous and current frames comprises the at least one of the subtitles and the on-screen display image;

the at least one edge area of the previous and current frames is set as the at least one static area when the luminance level within the at least one edge area is equal to or exceeds a predetermined luminance level; and the predetermined luminance level is substantially the same as at least one of a luminance level of the subtitles and a luminance level of the on-screen display image.

6. The method of claim 1, wherein the setting the at least one static area comprises extracting the edge areas of the previous frame and the edge areas of the current frame by performing high pass filtering on an image signal of the previous frame and an image signal of the current frame.

7. The method of claim 1, wherein the setting the at least one static area comprises receiving at least one of subtitle activation data and on-screen display image activation data from an external source and setting at least one edge area of the previous and current frames including the at least one of the subtitles and the on-screen display image as the at least one static area.

8. The method of claim 1, wherein the setting the at least one static area comprises receiving at least one of subtitle activation data and on-screen display image activation data from an external source, extracting a motion vector from the previous and current frames, and setting either at least one edge area of the previous and current frames in which the motion vector has a value of 0 or at least one edge area of the previous and current frames including the at least one of the subtitles and the on-screen display image as the at least one static area while prioritizing the at least one edge area including the subtitles or the on-screen display image over at least one edge areas in which the motion vector has a value of 0.

9. The method of claim 1, wherein:

the setting the at least one static area comprises receiving at least one of subtitle activation data and on-screen display image activation data from an external source and setting either at least one edge area of the previous and current frames including the at least one of the subtitles and the on-screen display image or at least one edge area of the previous frame and current frame wherein a luminance level within the at least one edge area is substantially the same in the current frame as in the previous frame as the at least one static area while prioritizing the at least one edge area including the at least one of the subtitles and the on-screen display image over the at least one edge area wherein the luminance level within the at least edge area is substantially the same in the current frame as in the previous frame.

10. A display device comprising:

a signal control module which receives an image signal of a previous frame and an image signal of a current frame and inserts an image signal of an interpolated frame between the previous frame and current frame, the signal control module comprising:

a static area setter which sets at least one static area in each of the previous frame and the current frame by comparing edge areas of the previous frame and edge areas of the current frame; and a luminance/color difference separator which separates luminance and color difference components of the image signal of the previous frame and separates luminance and color difference components of the image signal of the current frame; and an image interpolator which provides the image signal of the interpolated frame, wherein the static area of the previous frame is used in an unmodified state as a static area of the interpolated frame, wherein the static area setter sets at least one edge area of the previous and current frames in which a predetermined number of pixels have a luminance level corresponding to at least one of subtitles or an on-screen display image as the at least one static area, based on the luminance components of the image signals of the previous frame and current frame.

11. The display device of claim 10, wherein:

the signal control module further comprises a motion vector extractor which extracts a motion vector from the previous and current frames; and the static area setter sets at least one edge area of the previous and current frames in which the motion vector has a value of 0 as the at least one static area.

12. The display device of claim 11, wherein:

the motion vector extractor extracts the motion vector from the luminance components of the image signals of the previous frame and current frame.

13. The display device of claim 10, wherein:

the static area setter sets at least one edge area of the previous and current frames wherein a luminance level within the at least one edge area is substantially the same in the current frame as in the previous frame as the at least one static area.

14. The display device of claim 13, wherein:

each of the previous and current frames comprises the at least one of the subtitles and the on-screen display image;

the at least one edge area of the previous and current frames is set as the at least one static area when the luminance level within the at least one edge area is equal to or exceeds a predetermined luminance level; and the predetermined luminance level is substantially the same as a luminance level of the at least one of the subtitles and a luminance level of the on-screen display image.

15. The display device of claim 10, wherein the static area setter is provided with at least one of subtitle activation data and on-screen display image activation data by an external source and sets at least one edge area of the previous frame and current frame including the at least one of the subtitles and the on-screen display image as the at least static area.

16. The display device of claim 10, wherein the signal control module extracts the edge areas of the previous frame and the edge areas of the current frames by performing high pass filtering on the image signal of the previous frame and the image signal of the current frame.

17. The display device of claim 10, wherein:

the signal control module further comprises a motion vector extractor which extracts a motion vector from the previous and current frames; and the static area setter is provided with at least one of subtitle activation data and on-screen display image activation data by an external source and sets either at least one edge area of the previous and current frames in which the motion vector has a value of 0 or at least one edge areas of the previous and current frames including the at least one of the subtitles and the on-screen display image as the at least one static area while prioritizing the at least one edge area including the at least one of the subtitles and the on-screen display image over the at least one edge area in which the motion vector has a value of 0.

18. The display device of claim 10, wherein:

the static area setter is provided with one of subtitle activation data and on-screen display image activation data by an external source, and sets either at least one edge area of the previous and current frames including the at least one of the subtitles and the on-screen display image or at least one edge area of the previous and current frames wherein a luminance level within the at least edge area is substantially the same in the current frame as in the previous frame as the at least one static area while prioritizing the at least one edge area including the at least one of the subtitles and the on-screen display image over the at least one edge area in which the predetermined luminance level is detected.

19. The display device of claim 10, wherein the at least one static area includes at least one of a static object and static characters.

20. The display device of claim 19, wherein the static characters include the at least one of the subtitles and the on-screen display image.

* * * * *